June 20, 1950 A. L. O'CONNOR, JR 2,512,256
GUNNERY TRAINING DEVICE
Filed April 13, 1948 2 Sheets-Sheet 1

INVENTOR.
A. L. O'CONNOR JR.
BY Wade Koontz
Chester Tietz
ATTORNEYS

June 20, 1950  A. L. O'CONNOR, JR  2,512,256
GUNNERY TRAINING DEVICE

Filed April 13, 1948  2 Sheets-Sheet 2

INVENTOR.
A.L. O'CONNOR JR.
BY Wade Roonty
Chester Tietz and
ATTORNEYS

Patented June 20, 1950

2,512,256

UNITED STATES PATENT OFFICE 2,512,256

GUNNERY TRAINING DEVICE

Andrew Louis O'Connor, Jr., Grosse Ile, Mich., assignor to the United States of America as represented by the Secretary of the Air Force Application April 13, 1948, Serial No. 20,700

1 Claim. (Cl. 35—25)

The invention described herein may be manufactured and used by or for the Government for governmental purposes without payment to me of any royalty thereon.

This invention relates to a method and a device for training aerial gunners, i. e. aviation, military or naval personnel who are to shoot at flying aircraft and the like. In such actual military work, attack may come with great suddenness from any quarter.

One object of this invention is to provide a method of general application for simulating an attacking airplane. The method makes it possible to produce suddenly, a moving image on a screen simulating an attacking airplane and to move a dot elsewhere in accordance with the movements of the airplane image, so that a score may be kept photoelectrically of the proportion of the time that the airplane image is kept in the line of sight of a simulated gun.

Another object of the invention is to provide an apparatus in which the method may be carried out. Other forms of apparatus may also employ the method.

Another object of the invention is to provide a projection apparatus in which the film-to-lens distance is not critical and in which two films, traveling at right angles to each other, generate the dot image from crossed lines.

Referring now to the drawings:

Fig. 3 is a perspective view of the cross-film projector showing the drive thereof.

Figure 1:
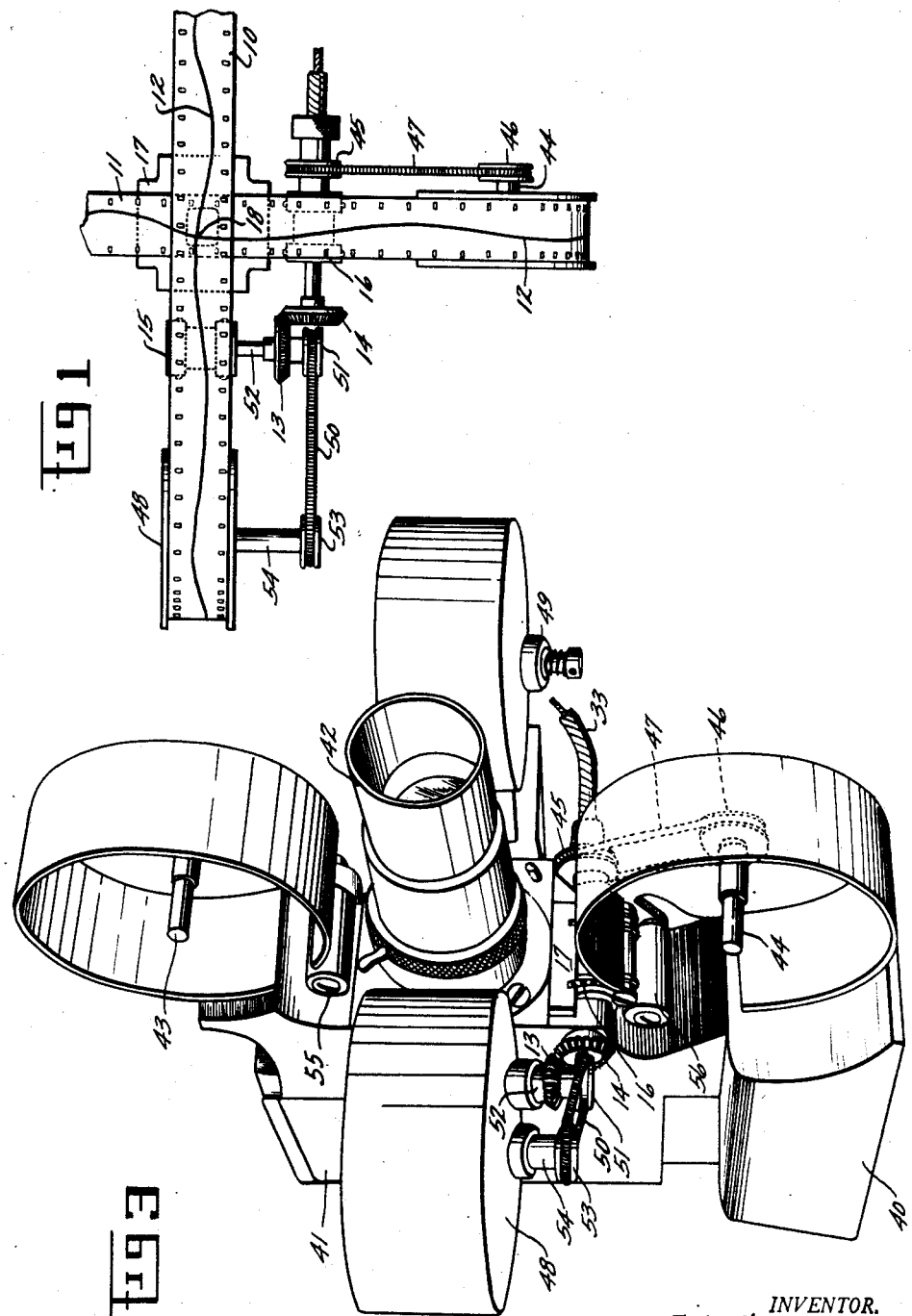
Fig. 1 is a diagrammatic view showing the crossed films. It illustrates the method of forming the dot which is to be projected and photoelectrically observed.

In Fig. 1, 10 is a horizontally traveling motion picture film and 11 is a vertically traveling film. Both films bear transparent lines 12 which may be produced by scoring the fully exposed and developed emulsion with a scriber. Black lines on an otherwise transparent film may also be employed. 13 and 14 are the bevel gears of a suitable drive for the film and 15 and 16 are drive sprockets, 17 is a suitable shutter for turning the projected image off and on to provide intermittent or "surprise" projection. Where the lines 12—12 meet a dot, 18 is formed, and is projected. Individually, the black lines 12—12 are too indistinct to be noticed on the screen (not shown in this figure) upon which the two films are projected, but their crossing point is sufficiently distinct and forms a mobile dot. To this end, the focus of the projector is adjusted so that the images of both films 10 and 11 together are formed clearly on the screen. A high degree of accuracy in focusing is not necessary. In order to avoid scratching of the film, one is wound emulsion side in and the other emulsion side out. By such arrangement, the emulsion sides do not rub each other during projection. While it is preferred that the films should cross each other at right angles, it is not essential that accuracy in this respect be observed.

Figure 2:
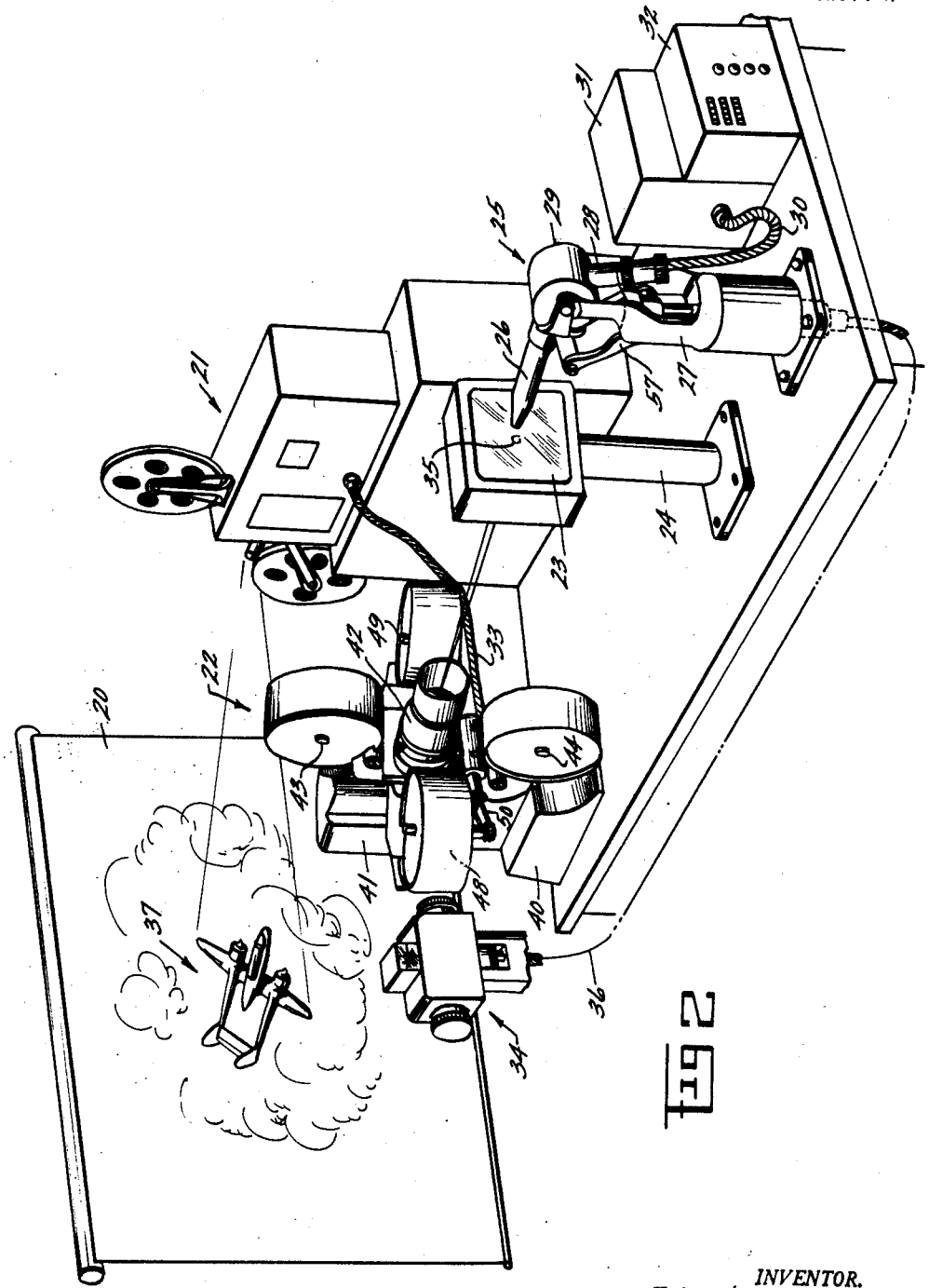
Fig. 2 is a perspective view showing the assembly of apparatus for dot image formation and photoelectric registration.

Referring now to Fig. 2, 20 is a projection screen and 21 is a motion picture projector arranged to project an airplane 37 in motion at intervals onto the screen 20 to simulate an aerial attack. The projector 21 does not employ cross films as shown in Fig. 1, but only a single one from which the cross films used by a projector 22 are produced by hand scribing. The projector 22 employs the cross films 10 and 11 shown in Fig. 1. These films are produced by scribing paths on the blank exposed and developed film corresponding to the airplane action on the film used by projector 21. The paths are produced by plotting a series of points on each film, each point representing the location of the airplane image on the screen 21. The films are moved frame by frame and a point plotted for each frame. First one film 10 is completely plotted, this being the uppermost film. Then the position of the films is reversed, film 11 now being uppermost and a complete plot made upon it. Joining the plotted points by a line on each film forms the tracks 12—12. If mere practice in gun pointing is desired, without keeping an accurate check on the score, then the cross films and resulting dot 35 may be projected directly onto a screen. However, that is not the preferred method. The one which is preferred and which will here be described is a method of projecting a moving airplane and automatically keeping score or at least some measurement of the time during which a simulated gun 34 is being pointed at the airplane under conditions in which hits would be scored if the airplane were hostile.

Since the dot represents the airplane image and must be synchronized with the position of the latter, it is advantageous to use separate films, the crossing of which produces the dot. The advantage is realized from the fact that the azimuth and elevation of the dot can be controlled with less difficulty by drawing two films than one. The use of two films makes it easier to control a dot position since the azimuth position can be established largely with one film and the variation in elevation with another.

The purpose of cross-film projector 22 is, therefor, to project a moving dot 35 on a condensing lens 23 which, for convenience, is mounted in a stand 24 and is approximately rectangular. The projector 21 and the projector 22 face in opposite direction. The moving dot 35 on lens 23 is followed by a photoelectric follower 25 which comprises a finger 26 mounted on a swivel stand 27. The follower 26 is arranged to follow and to move in synchronism with a simulated gun 34 (or, in usual practice, merely the sighting and controlling equipment thereof). Mechanical or electrical linkage 36 corrects the gun 27 and follower 26 and such linkage is known. Electrical linkage which is suitable is of the synchro type or that used in the Gray "Telautograph." Any mechanical equivalent of such a linkage is also suitable and for short distance use is preferred. A Bowden wire arranged to transmit a push, a pull or a rotation is shown in Fig. 2.

The finger 26 of follower 25 contains a condensing lens system (not shown) by means of which light from the dot (or absence of light if the dot is projected black) is focused on a photocell 28 which enters a trunnion 29 to interpose the photocell in the light path from the lens system. The finger 26 is mounted on a universal swiveling head 57.

Electrical connections 30 of a conventional nature run from the photocell 28 to an amplifier 31 and thence to a scoring device 32 which may be of any desired and suitable nature, as for example, a condenser and means for measuring its accumulated charge. Such an apparatus is broadly, not new, and has the function of measuring the time during which the dot illuminates the photocell. Such time indicates how long the trainee's aim was correct.

Synchronism between projectors 21 and 22 is obtained by the provision of a drive shaft 33 by which projector 22 is preferably driven from projector 21. The films projected by the two projectors may be both positive, or both negative. However it is preferred to project positive film in projector 21 and negative film in projector 22.

Referring now to Fig. 3, this figure illustrates an actual embodiment of a projector capable of operation on the principle illustrated in Fig. 1. The projector comprises a base 40 surmounted by a housing 41 which contains a conventional light source (not shown). A lens tube 42 projects forwardly from the housing 41 as in conventional projectors. A shutter 17 occupies a space between the rear end of the lens tube 42 and the housing 41, which space also accommodates the passage of crossed films (not shown). At top and bottom of the housing 41 there are film reels 43 and 44 respectively, reel 44 being driven from shaft 33 by a pair of pulleys 45 and 46 over which a coiled spring wire belt 47 passes. This drive is also shown in Fig. 1. The shaft 33 drives bevel gear 14 which in turn drives a similar bevel gear 13. Both gears have associated with them on their drive shafts sprockets 16 and 15 respectively which engage the films 11 and 10 respectively by conventional margin perforations in the film (shown in Fig. 1).

Referring again to Fig. 3, 48 and 49 are left and right hand reels for the driving of film 10 opposite to the direction just noted. 50 is a take up belt which extends from a drive pulley 51 on a shaft 52 which also carries bevel gear 13. The belt 50 drives the reel 48 by means of a pulley 53 on a shaft 54. Conventional rolls 55 and 56 may be provided on all film drives to decrease friction.

In this specification and its appended claim, the words "intermittent" and "intermittently" mean—separated by a complete stop—not separated only by an interval short enough to insure persistance of vision.

I claim as my invention:

In combination in a gunnery training device, a pair of oppositely disposed motion picture projectors, the first of said pair being a conventional projector projecting a conventional film, a drive shaft extending from said first projector to said second projector in synchronous driving relation thereto, means in the second projector for projecting a dot image by two driven film strips which overlap each other perpendicularly, each film strip bearing an image of a curve, one curve being representative of the vertical positioning of the image on the conventional film, and the other curve being representative of the horizontal position of the image on the conventional film, the curves being marked on their respective strips so as to contrast with the background of the strips to a degree which would not cause a dot or curve image on a lens when projected alone but able to form a dot image on a lens when projected together in their overlapping arrangement, a lens adapted to receive said dot image, a simulated gun adapted to be aimed by a trainee, a motion picture screen arranged to receive a moving image projected by the conventional projector and to be aimed at by the trainee, a follower including a photocell system and a finger connected to said simulated gun by a universal linkage and adapted to be actuated by said simulated gun through said linkage to follow said dot image on said lens when image is projected in a direction opposite to that in which the conventional projector is disposed, and a scoring device actuable by said photocell system for indicating the time proportion throughout which correctness of aim is maintained by the simulated gun.

ANDREW LOUIS O'CONNOR, Jr.

REFERENCES CITED

The following references are of record in the file of this patent:

UNITED STATES PATENTS

| Number | Name | Date |
| --- | --- | --- |
| 1,198,600 | Sudmann | Sept. 19, 1916 |
| 2,230,149 | Weddington | Jan. 28, 1941 |
| 2,392,142 | Gosswiller | Jan. 1, 1946 |
| 2,406,574 | Waller et al. | Aug. 27, 1946 |
| 2,442,748 | Blood et al. | June 8, 1948 |